(12) United States Patent
Chen et al.

(10) Patent No.: US 9,811,223 B2
(45) Date of Patent: Nov. 7, 2017

(54) METHOD AND APPARATUS FOR ENHANCING TOUCH SENSING IN A DISPLAY PANEL

(71) Applicant: Solomon Systech Limited, Hong Kong (HK)

(72) Inventors: Jun Chen, Hong Kong (HK); Cheung Fai Lee, Hong Kong (HK); Yiu Sang Lei, Hong Kong (HK); Wing Chi Stephen Chan, Hong Kong (HK)

(73) Assignee: Solomon Systech Limited, Hong Kong (HK)

( * ) Notice: Subject to any disclaimer, the term of this patent is extended or adjusted under 35 U.S.C. 154(b) by 186 days.

(21) Appl. No.: 14/807,894

(22) Filed: Jul. 24, 2015

(65) Prior Publication Data
US 2017/0024036 A1    Jan. 26, 2017

(51) Int. Cl.
*G06F 3/045* (2006.01)
*G06F 3/044* (2006.01)
*G02F 1/1333* (2006.01)
*G06F 3/041* (2006.01)

(52) U.S. Cl.
CPC .......... *G06F 3/044* (2013.01); *G02F 1/13338* (2013.01); *G06F 3/0412* (2013.01); *G06F 3/0416* (2013.01)

(58) Field of Classification Search
CPC ...... G06F 3/0412; G06F 3/0416; G06F 3/044; G02F 1/13338
See application file for complete search history.

(56) References Cited

U.S. PATENT DOCUMENTS

| | | | | |
|---|---|---|---|---|
| 6,239,788 B1* | 5/2001 | Nohno | .................. | G06F 3/0412 178/18.03 |
| 9,024,913 B1* | 5/2015 | Jung | ....................... | G06F 3/044 178/18.06 |
| 9,223,425 B1* | 12/2015 | Kim | ...................... | G06F 3/0412 |
| 2008/0018581 A1* | 1/2008 | Park | ....................... | G06F 3/0412 345/98 |
| 2010/0013791 A1* | 1/2010 | Haga | ...................... | G06F 3/0412 345/174 |
| 2013/0328824 A1* | 12/2013 | Krah | ....................... | G06F 3/041 345/174 |

(Continued)

*Primary Examiner* — Yuzhen Shen
(74) *Attorney, Agent, or Firm* — Spruson & Ferguson (HK)

(57) ABSTRACT

Driving a touch-sensing-enabled active matrix LCD display panel for enhancing touch sensing by reducing parasitic capacitances is considered. In one embodiment, a plurality of driving voltages is generated. The driving voltages include a common voltage, and a first and a second gate-drive reference voltages for configuring a thin film transistor (TFT) in the panel to switch on and off, respectively. When the panel is operated in a sensing mode, the common voltage that is generated includes a pulse-train waveform. Furthermore, each of the first and the second gate-drive reference voltages is substantially time-synchronized to and includes the pulse-train waveform of the common voltage during the sensing mode. In one option, the driving voltages further include a sensing-mode source-drive voltage acting as a source-drive signal for the TFT during the sensing mode. The sensing-mode source-drive voltage is substantially time-synchronized to and includes the pulse-train waveform of the common voltage.

13 Claims, 9 Drawing Sheets

(56) References Cited

U.S. PATENT DOCUMENTS

| | | | |
|---|---|---|---|
| 2015/0049045 A1* | 2/2015 | Yousefpor | G06F 3/0412 345/174 |
| 2015/0220208 A1* | 8/2015 | Noguchi | G06F 3/0412 345/174 |
| 2016/0004371 A1* | 1/2016 | Kim | G06F 3/0418 345/173 |
| 2016/0092027 A1* | 3/2016 | Lee | G06F 3/044 345/174 |
| 2016/0188065 A1* | 6/2016 | Kang | G06F 3/0412 345/173 |

\* cited by examiner

METHOD AND APPARATUS FOR ENHANCING TOUCH SENSING IN A DISPLAY PANEL

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to driving a touch-sensing-enabled active matrix liquid crystal display (LCD) panel (or touchscreen) configurable to be in a display mode or in a sensing mode. In particular, the present invention relates to a method and an apparatus for driving the sensing function of an in-cell, self-capacitance type capacitive touchscreen.

BACKGROUND

A touch-sensing-enabled active matrix LCD display panel (or touchscreen) is an active matrix LCD panel having an additional function of detecting a location of a possible finger and/or pointing device touch made on the panel. A capacitive touchscreen comprises an insulator such as glass, coated with a transparent conductor. As the human body also conducts electricity, touching the surface of the screen results in a distortion of the screen's electrostatic field, measurable as a change in capacitance. Various technologies can then be used to detect the location of the touch point.

The detection may be done by an electrostatic capacitance method. In the art, it is known that parasitic capacitance in the panel affects the sensitivity in the touch detection. The effective parasitic capacitance is nonlinear and voltage-dependent. It is desirable to reduce the parasitic capacitance or the voltage dependency thereof.

In U.S. Patent Application Publication No. 2015/0084911, the effective parasitic capacitance experienced in touch sensing is reduced by configuring a second transistor to cause the parasitic capacitance to be between a gate line and a drain of the second transistor instead of between the gate line and a drain of a first transistor. In U.S. Patent Application Publication No. 2014/0043546, a stress-relief layer whose product of dielectric constant and specific gravity is smaller than that of a substrate is added to a touch sensor in order to reduce the parasitic capacitance. Although not directly related to parasitic-capacitance reduction, U.S. Pat. No. 8,933,895 teaches introducing an additional network of common-voltage electrodes arranged side by side on a display panel so that the touch detection sensitivity is increased while suppressing influence to the display operation.

The methods disclosed in these prior-art references require additional materials and/or circuitry components, thereby increasing the costs in the implementation of these methods. There is a need in the art to have a technique for reducing parasitic capacitance or its voltage dependency without considerably increasing the implementation complexity.

SUMMARY OF THE INVENTION

The present invention provides a method and an apparatus for driving a touchscreen with an advantage of reducing parasitic capacitances during touch sensing mode, reducing the number of components in the driver electronics, and reducing power consumption.

The apparatus comprises one or more voltage generators for generating a plurality of driving voltages. The plurality of driving voltages includes a common voltage for powering a backplane of the panel, a first gate-drive reference voltage receivable by a gate of a TFT in each LCD cell of the panel for configuring the TFT to switch on during the display mode, and a second gate-drive reference voltage receivable by the gate of the TFT for configuring the TFT to switch off during the display mode.

The method comprises generating the plurality of driving voltages such that: when the panel is operated in the sensing mode, the common voltage that is generated includes a pulse-train waveform; and each of the first and the second gate-drive reference voltages is substantially time-synchronized to and includes the pulse-train waveform of the common voltage during the sensing mode.

In one realization of the method, the common voltage during the sensing mode has a minimum value substantially similar to a negative supply voltage used for powering a plurality of source drivers. In another realization, the pulse-train waveform has a voltage swing substantially similar to a supply voltage used for powering the plurality of source drivers.

In the disclosed apparatus, the one or more voltage generators are configured to use the disclosed method to generate the plurality of driving voltages.

Optionally, the plurality of driving voltages further includes a sensing-mode source-drive voltage acting as a source-drive signal applied to the TFT during the sensing mode. In addition, the one or more voltage generators are further configured such that the sensing-mode source-drive voltage is substantially time-synchronized to and includes the pulse-train waveform of the common voltage during the sensing mode.

Other aspects of the present invention are disclosed as illustrated by the embodiments hereinafter.

BRIEF DESCRIPTION OF THE DRAWINGS

Embodiments of the invention are described in more detail hereinafter with reference to the drawings, in which.

DETAILED DESCRIPTION

In the following description, the methods and apparatuses for driving touchscreen panels are set forth as preferred examples. It will be apparent to those skilled in the art that modifications, including additions and/or substitutions, may be made without departing from the scope and spirit of the invention. Specific details may be omitted so as not to obscure the invention; however, the disclosure is written to enable one skilled in the art to practice the teachings herein without undue experimentation.

Figure 1:
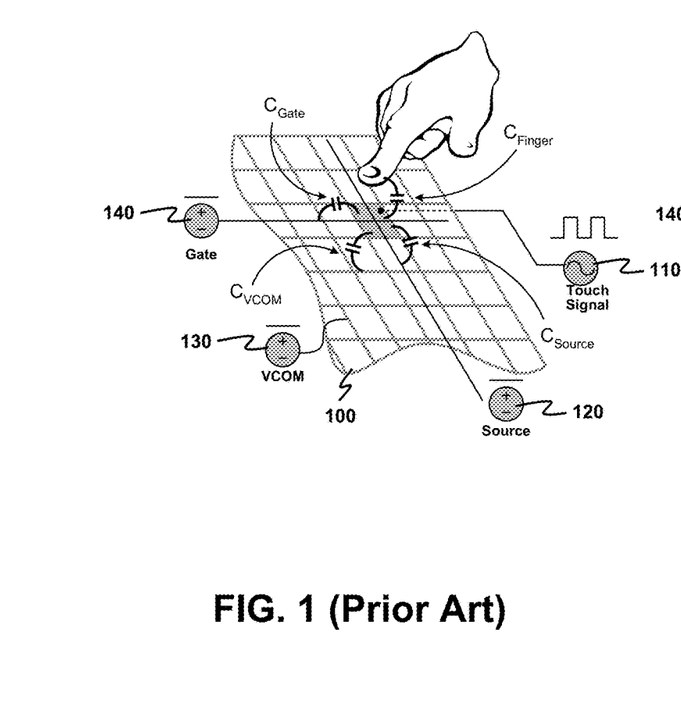
FIG. 1 depicts a typical arrangement of setting a common voltage, a gate-drive signal, a source-drive signal and a touch-detecting signal for application to a touch-sensing-enabled active matrix LCD display panel during touch sensing.
Figure 2:
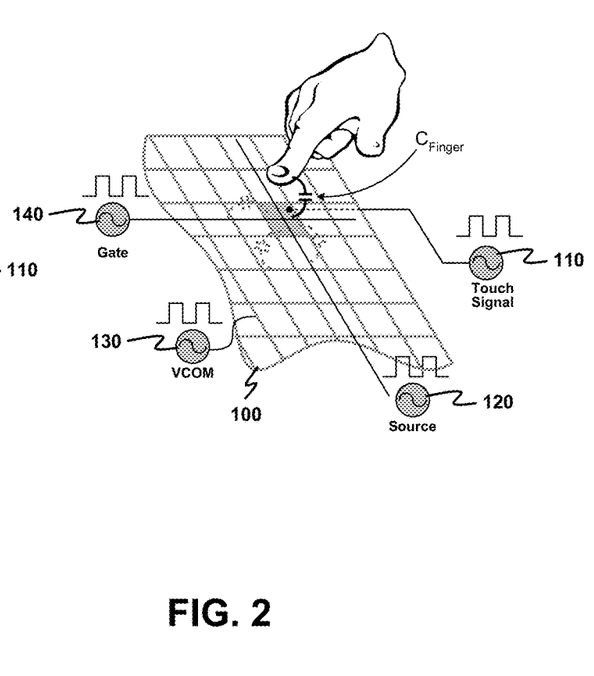
FIG. 2 exemplarily depicts an improved arrangement of setting the common voltage, the gate-drive signal and the source-drive signal for enhancing touch sensing by reducing parasitic capacitances.

FIG. 1 depicts a typical arrangement of driving a touch-sensing-enabled active matrix LCD display panel during touch detection. A touch sensing signal 110, which is a high-magnitude pulse-train signal, is sent to a panel 100 for detecting a possible finger touch on the panel 100 while a common voltage 120, a source-drive signal 130 and a gate-drive signal 140 are maintained to be substantially constant during sensing. Parasitic capacitances that result vary considerably as the voltage difference between the touch sensing signal 110 and each of the signals 120, 130 and 140 changes. FIG. 2 depicts an arrangement, on which the present invention is based, for reducing the parasitic capacitances. The specific feature is that by having the touch sensing signal 110 synchronized with the signals 120, 130 and 140 in time and in voltage, the parasitic capacitances are made approximately invariant and reduced with only a marginal addition of circuits in implementation. Since the touch-sensing signal 110 and the common voltage 120 are synchronized in time, a further reduction in circuit complexity is obtainable by multiplexing the common voltage 120 and the touch-sensing signal 110. In addition, when comparing FIGS. 1 and 2, the modification that is made is replacing a substantially-constant voltage at each of the common voltage 120, the source-drive signal 130 and the gate-drive signal 140 with a waveform similar to the touch-sensing signal 110. This modification is easy to be implemented and thus only requires a small increase in implementation complexity of a display driver. The aforementioned observations lead to the present invention.

An aspect of the present invention is to provide a method and an apparatus for driving a touch-sensing-enabled active matrix LCD display panel with an objective to reduce parasitic capacitances. The panel is configurable to be operated in a display mode or in a sensing mode.

Figure 3A:
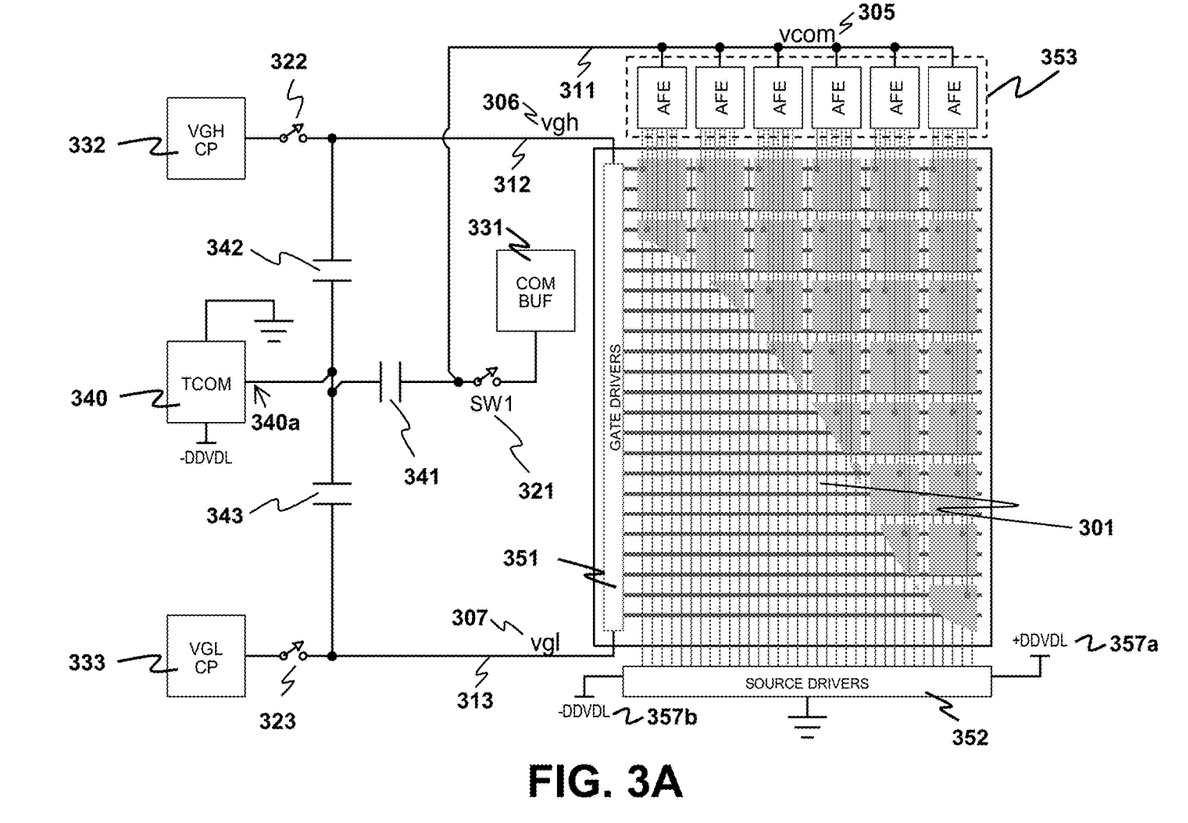
FIG. 3A is a first embodiment of driving the display panel in order to reduce parasitic capacitances for touch sensing.

FIG. 3A depicts a first embodiment of the apparatus as disclosed herein according to the present invention. A panel 301 comprises a plurality of LCD cells each having a TFT for driving a liquid crystal therein. A plurality of gate drivers 351 and a plurality of source drivers 352 are in turn used to drive the TFT by providing a gate-drive signal and a source-drive signal thereto, respectively. Generally, the plurality of source drivers 352 is powered by a positive supply voltage (+DDVDL 357a) and a negative supply voltage (−DDVDL 357b). The apparatus comprises one or more voltage generators (e.g., COM BUF 331, VGH CP 332, VGL CP 333 and TCOM 340, the functions of all of which will be explained below) for generating a plurality of driving voltages. The plurality of driving voltages includes a common voltage (vcom 305) for powering a backplane of the panel 301, a first gate-drive reference voltage (vgh 306) receivable, through the plurality of gate drivers 351, by a gate of a TFT in each LCD cell of the panel 301 for configuring the TFT to switch on during the display mode, and a second gate-drive reference voltage (vgl 307) receivable, also through the plurality of gate drivers 351, by the gate of the TFT for configuring the TFT to switch off during the display mode.

Figure 3B:
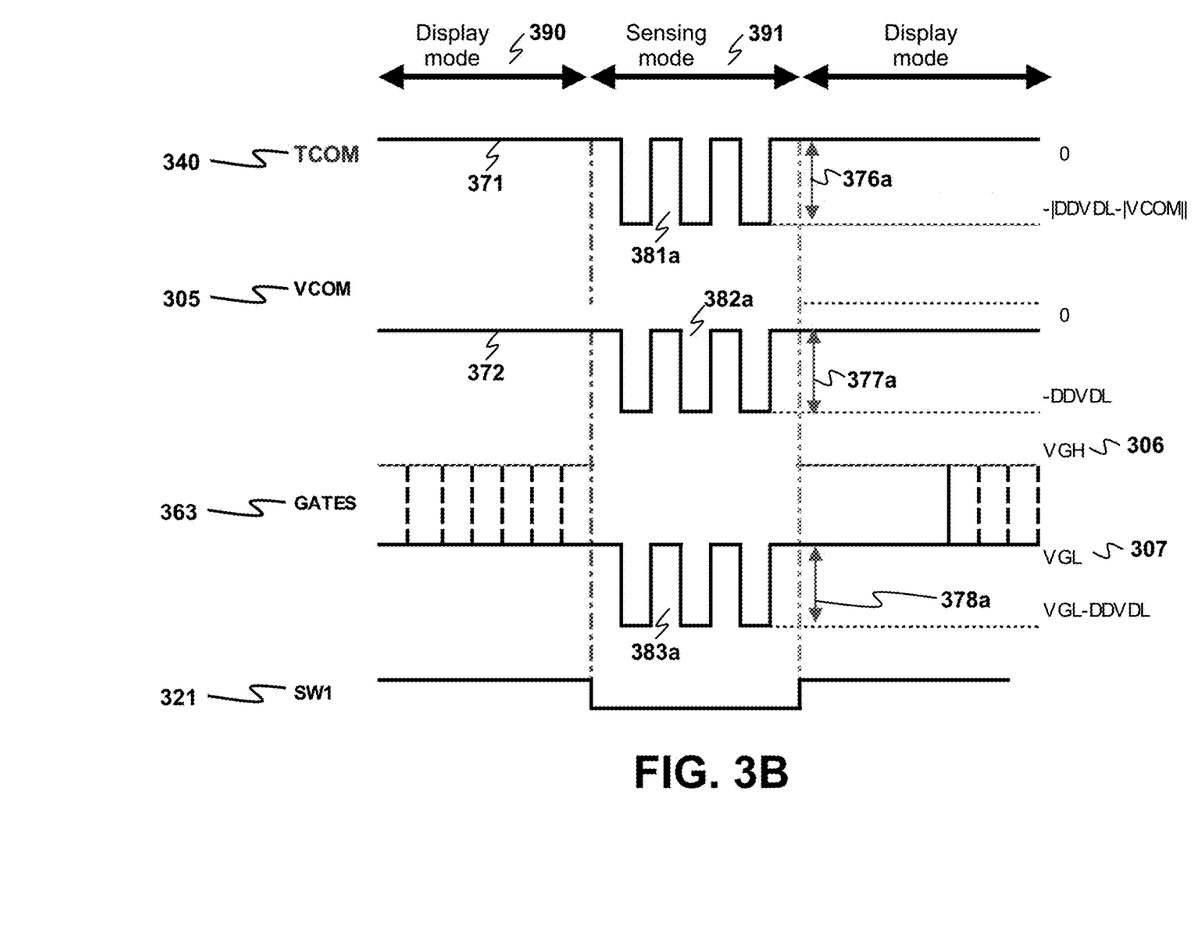
FIG. 3B is a diagram illustrating voltage waveforms at various nodes of interest when the panel is driven according to the arrangement shown in FIG. 3A.

Exemplarily, the method disclosed herein is illustrated with an aid of FIG. 3B, which depicts voltage waveforms at various nodes of interest when the panel 301 is driven by the arrangement shown in FIG. 3A. The method comprises generating the common voltage 305, the first gate-drive reference voltage 306 and the second gate-drive reference voltage 307. During the sensing mode (indicated by a reference numeral 391), the common voltage 305 is not a direct-current (DC) signal. When the panel 301 is operated in the sensing mode 391, the common voltage 305 includes a DC component and an alternating-current (AC) component. The AC component is a pulse-train waveform 382a having a voltage swing 377a. Turn to a gate-drive signal 363 received by the TFT. During the display mode (indicated by a reference numeral 390), the gate-drive signal 363 generally jumps between the first gate-drive reference voltage 306 and the second gate-drive reference voltage 307. When the panel 301 is operated in the sensing mode 391, the gate-drive signal 363 becomes deterministic and includes an AC component that is a second pulse-train waveform 383a having a certain voltage swing 378a. In particular, the second pulse-train waveform 383a is made substantially similar to the pulse-train waveform 382a of the common voltage 305. It is achieved by configuring each of the first gate-drive voltage 306 and the second gate-drive voltage 307 to be substantially time-synchronized to and includes the pulse-train waveform 382a of the common voltage 305 during the sensing mode 391.

The one or more voltage generators in the apparatus are configured to generate the plurality of driving voltages according to the disclosed method.

Refer to FIGS. 3A and 3B. In the apparatus, the one or more voltage generators include a first voltage generator (COM BUF 331) for providing a first substantially-constant voltage 372 receivable as the common voltage 305 by the panel 301 during the display mode 390, a second voltage generator (VGH CP 332) for providing a second substantially-constant voltage to form the first gate-drive reference voltage 306 during the display mode 390, and a third voltage generator (VGL CP 333) for providing a third substantially-constant voltage to form the second gate-drive reference voltage 307 during the display mode 390. The one or more voltage generators further include a waveform generator (TCOM 340) activated only during the sensing mode 391 to generate a third pulse-train waveform 381a where the third pulse-train waveform 381a is to form the pulse-train waveform 382a of the common voltage 305, thereby requiring the third pulse-train waveform 381a to be substantially similar to the pulse-train waveform 382a. Optionally, the waveform generator 340 provides a certain DC voltage 371 during the display mode 390. The apparatus further comprises a first switch 321, a second switch 322, a third switch 323, a first capacitor 341, a second capacitor 342, a third capacitor 343, a first receiving node 311 connectable to the panel 301 for enabling the panel 301 to receive the common voltage 305, a second receiving node 312 connectable to the plurality of gate drivers 351 for enabling the plurality of gate drivers 351 to receive the first gate-drive reference voltage 306, and a third receiving node 313 connectable to the plurality of gate drivers 351 for enabling the plurality of gate drivers 351 to receive the second gate-drive reference voltage 307. The first switch 321 couples the first voltage generator 331 and the first receiving node 311. The second switch 322 couples the second voltage generator 332 and the second receiving node 312. The third switch 323 couples the third voltage generator 333 and the third receiving node 313. The first switch 321, the second switch 322 and the third switch 323 are configured to be connected during the display mode 390 and disconnected during the sensing mode 391. The first capacitor 341 couples the first receiving node 311 and a waveform output 340a of the waveform generator 340, the second capacitor 342 couples the second receiving node 312 and the waveform output 340a, and the third capacitor 343 couples the third receiving node 313 and the waveform output 340a. Through capacitive coupling, the third pulse-train waveform 381a is simultaneously directed to the three receiving nodes 311, 312, 313 during the sensing mode 391. As such, the third pulse-train waveform 381a forms the pulse-train waveform 382a of the common voltage 305. Due to capacitive coupling, the third pulse-train waveform 381a has a voltage swing 376a substantially similar to the voltage swings 377a, 378a.

One particular advantage of the disclosed apparatus is that it is realizable by adding a few hardware parts on a commonly-used display driver. The commonly-used display driver is usually equipped with the voltage generators 331, 332, 333 and the capacitors 341, 342, 343. To realize the disclosed apparatus, it is only required to add the waveform generator 340 and the switches 321, 322, 323. An ordinary skilled person is capable of realizing the waveform generator 340 and the switches 321, 322, 323 based on the state of knowledge in the art.

In general, the touch-sensing accuracy is increased if the voltage swing 377a is made higher, especially when the common voltage 305 is substantially similar to a touch-sensing signal (namely, the signal 110 of FIG. 1). In one practical implementation, which is shown in FIG. 3B for illustration, the voltage swing 377a of the pulse-train waveform 382a is selected such that during the sensing mode 391, the common voltage 305 has a minimum value substantially similar to the negative supply voltage 357b. Then the voltage swing 377a is given by the absolute magnitude of DDVDL−|VCOM| when VCOM is a negative value, where −DDVDL is the negative supply voltage 357b and VCOM is the first substantially-constant voltage 372 (i.e. the common voltage 305 observed during the display mode 390). Therefore, an ordinary person skilled in the art can configure the waveform generator 340 to generate the third pulse-train waveform 381a that has the voltage swing 376a equal to or approximately equal to this absolute magnitude.

Figure 4A:
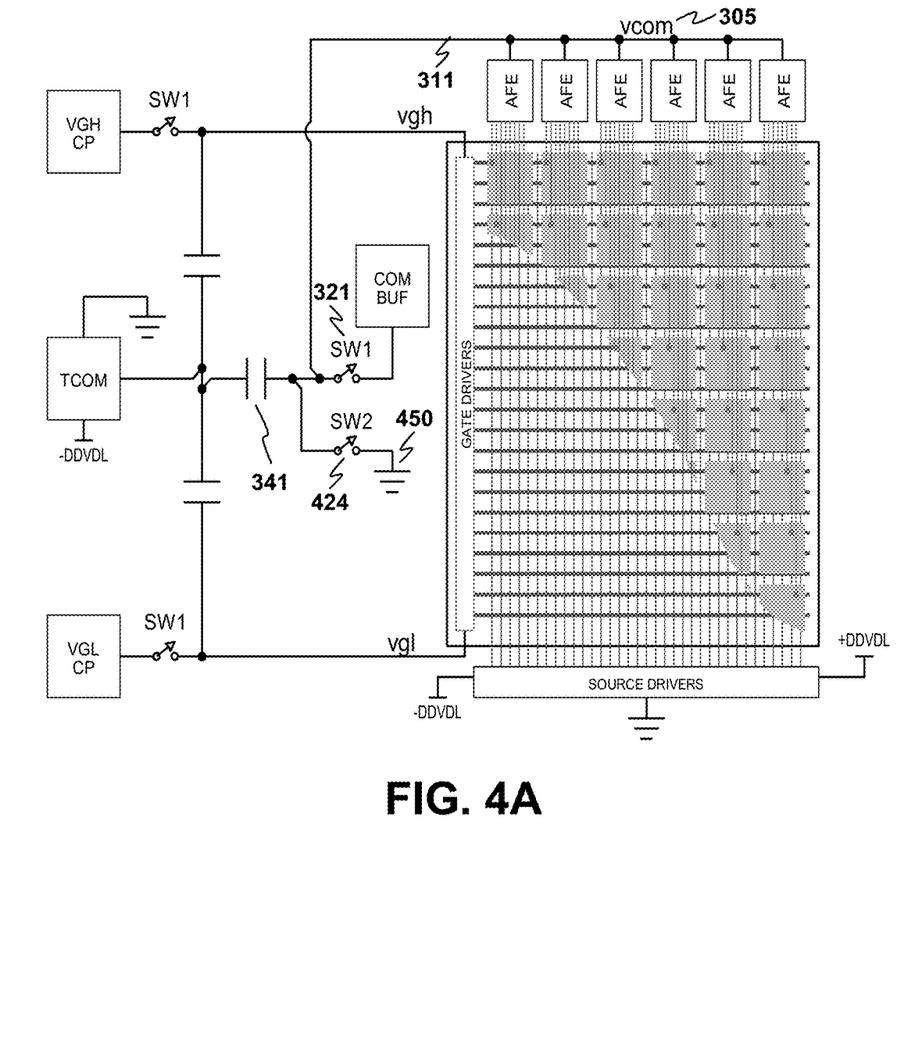
FIG. 4A is a second embodiment of driving the display panel in order to reduce parasitic capacitances for touch sensing.
Figure 4B:
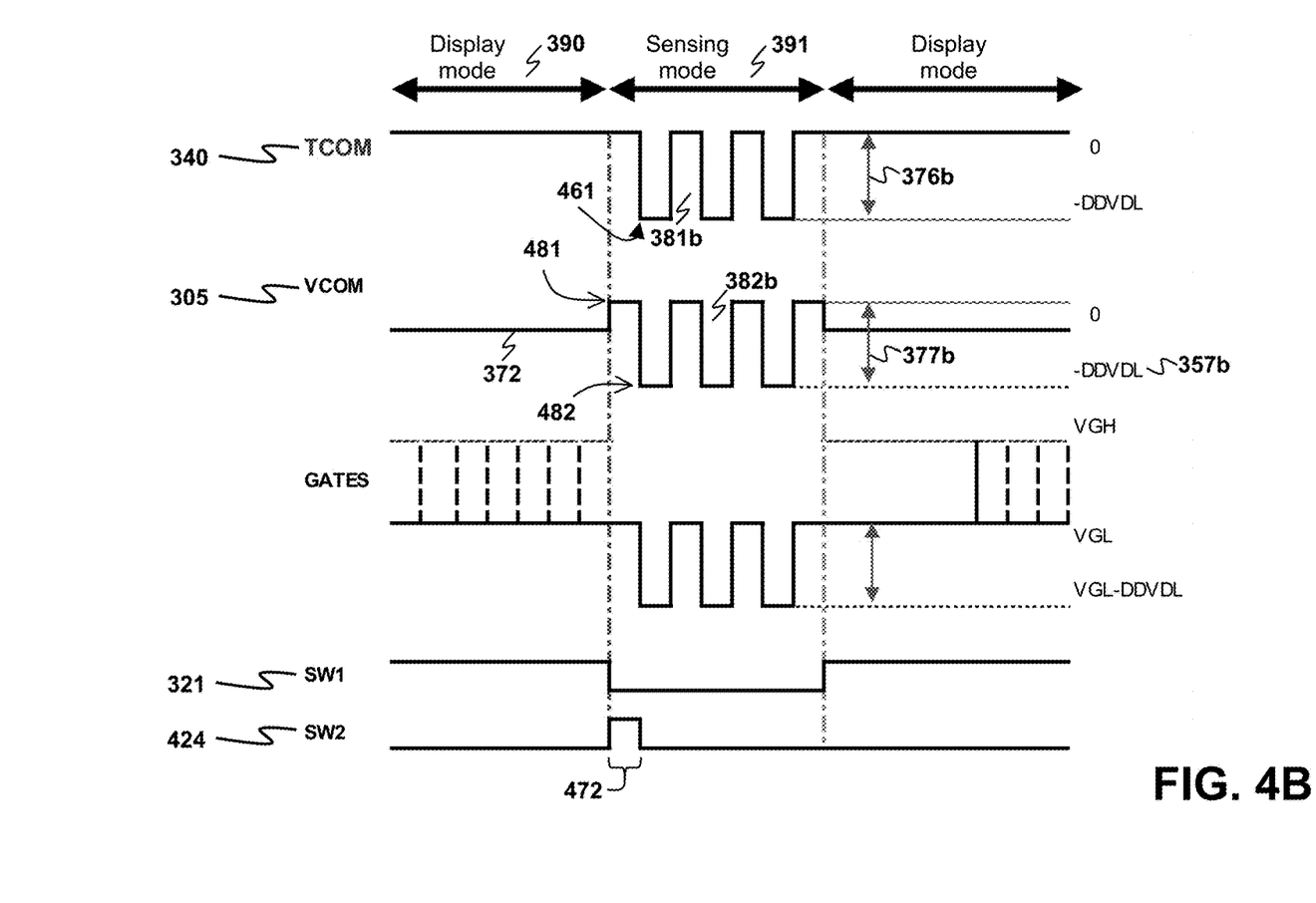
FIG. 4B is a diagram illustrating voltage waveforms at various nodes of interest when the panel is driven according to the arrangement shown in FIG. 4A.

FIG. 4A depicts a second embodiment of the apparatus in accordance with the present invention. A corresponding method for driving the panel 301 is illustrated with reference to FIG. 4B, which depicts voltage waveforms at various nodes of interest when the arrangement shown in FIG. 4A is used. When compared to FIG. 3A, the apparatus further comprises a fourth switch 424 coupling the first receiving node 311 and a ground 450. The fourth switch 424 is configured to be disconnected during the display mode 390. When the panel 301 transits from the display mode 390 to the sensing mode 391, the fourth switch 424 is configured to become connected for a time period 472. In particular, the time period 472 ends before an earliest transition 461 in the third pulse-train waveform 381b generated during the sensing mode 391 by the waveform generator 340. An ordinary skilled person can easily identify that the earliest transition 461 is an edge of the third pulse-train waveform 381b. As shown in FIG. 4B, when the panel 301 transits from the display mode 390 to the sensing mode 391, the common voltage 305 is set to a ground voltage 481. Afterwards, the capacitive coupling of the first capacitor 341 directs the third pulse-train waveform 381b to form the pulse-train waveform 382b of the common voltage 305. If the first substantially-constant voltage 372 (namely, the common voltage 305 during the display mode 390) is less than the ground voltage 481, a rise to the ground voltage 481 enables the common voltage 305 to have an increase in the voltage swing 377b. It is because most often and as a result of integrated circuit electronics, the negative supply voltage 357b is a limit restricting a lowest voltage 482 that can be attained by the common voltage 305. As one practical, advantageous option shown in FIG. 4B, the voltage swing 377b of the common voltage 305 is DDVDL, i.e. the positive supply voltage 357a. It is achievable by configuring the waveform generator 340 to generate the third pulse-train waveform 381b with the voltage swing 376b substantially close to DDVDL. However, the transient responses of the common voltage 305 caused by the connection/disconnection of the fourth switch 424 occupy portions of the time window and shorten the actual time period for the sensing mode.

Figure 5A:
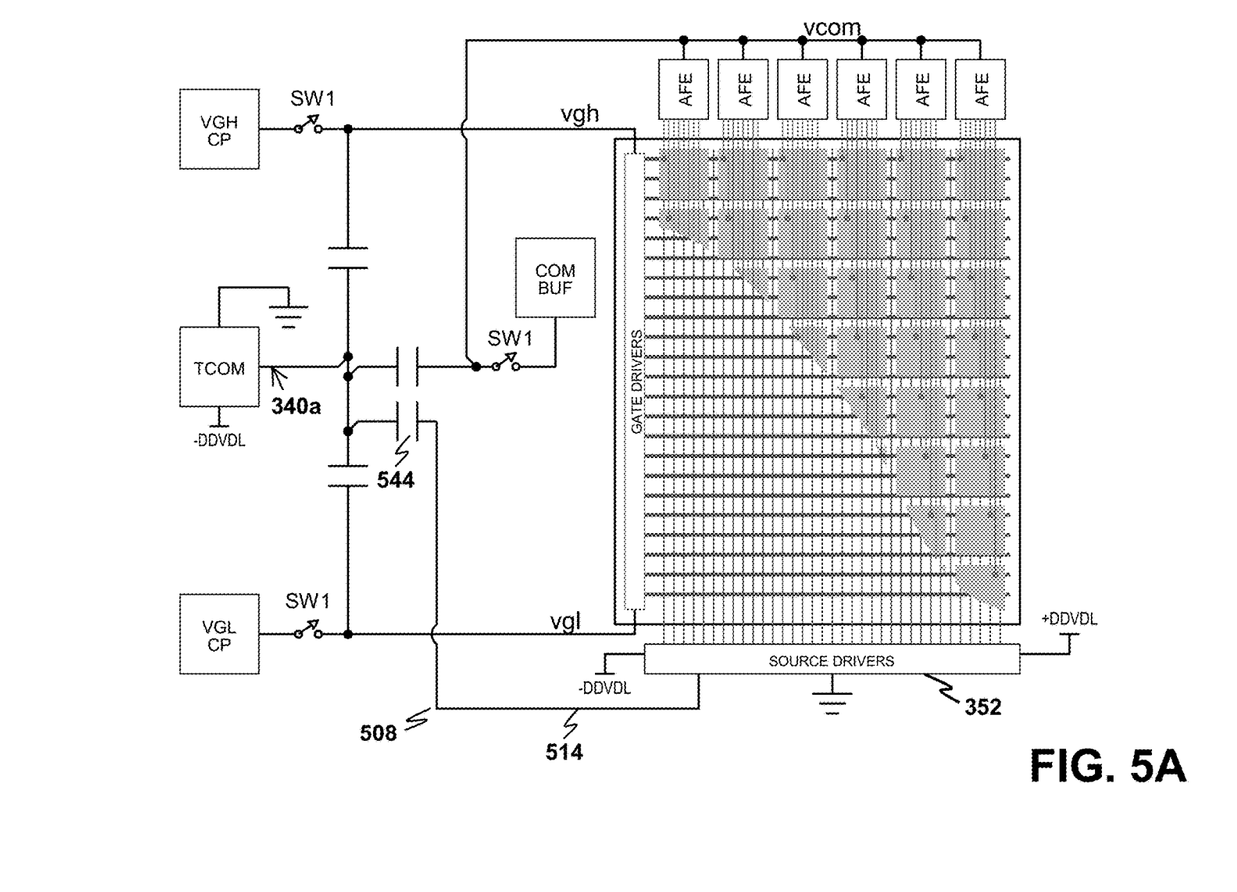
FIG. 5A is a third embodiment of driving the display panel in order to reduce parasitic capacitances for touch sensing.
Figure 5B:
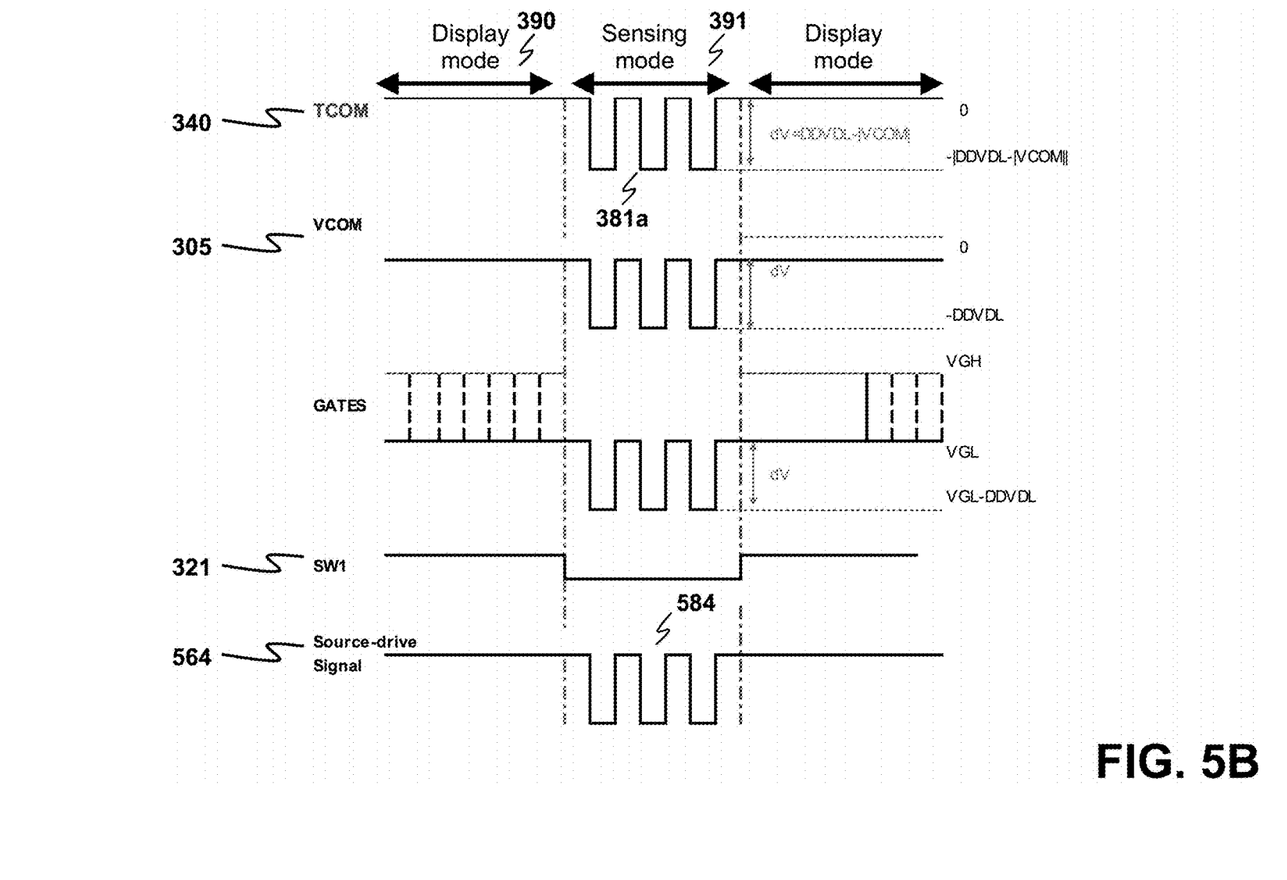
FIG. 5B is a diagram illustrating voltage waveforms at various nodes of interest when the panel is driven according to the arrangement shown in FIG. 5A.
Figure 5C:
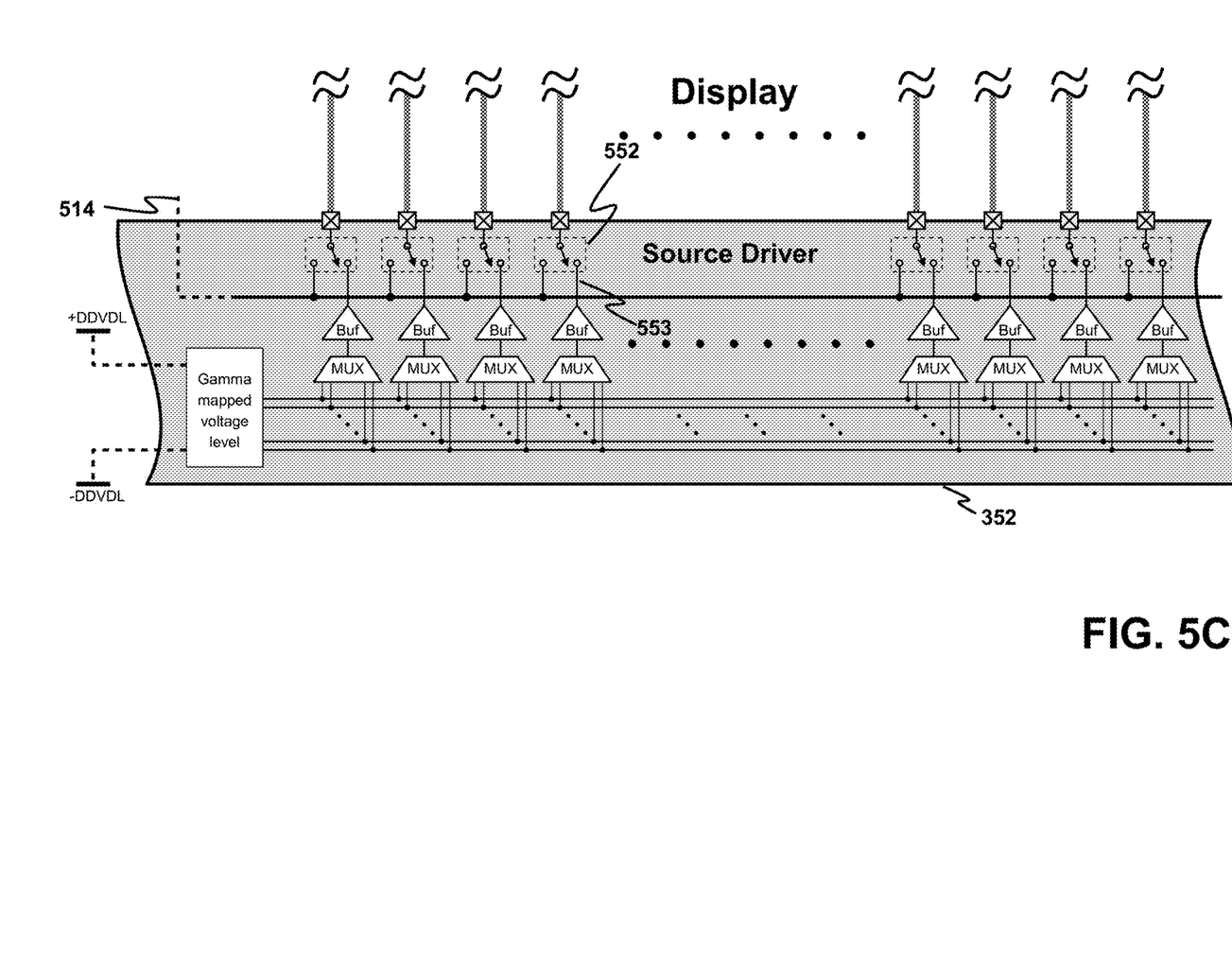
FIG. 5C is one realization of the source drivers used in third embodiment of driving the display panel shown in FIG. 5A.

FIG. 5A depicts a third embodiment of the apparatus according to the present invention. A corresponding method for driving the panel 301 is illustrated with reference to FIG. 5B, which depicts voltage waveforms at various nodes of interest when the arrangement shown in FIG. 5A is used. In the apparatus depicted in FIG. 5A, the plurality of driving voltages further includes a sensing-mode source-drive voltage 508 acting as the source-drive signal applied to the TFT during the sensing mode 391. When compared to FIG. 3A, the apparatus further comprises a fourth receiving node 514 and a fourth capacitor 544. The fourth receiving node 514 is connectable to the plurality of source drivers 352. In addition, the plurality of source drivers 352 is further configured to use the sensing-mode source-drive voltage 508 to act as the source-drive signal during the sensing mode 391. The fourth capacitor 544 couples the waveform output 340a and the fourth receiving node 514. It is noted that the apparatus shown in FIG. 5A is similar to the one shown in FIG. 3A except that the source-drive signal (indicated by a reference numeral 564 in FIG. 5B) of the plurality of source drivers 352 is replaced by a substitute pulse-train waveform 584 substantially similar to the third pulse-train waveform 381a generated by the apparatus of FIG. 3A. The operating principle of the apparatus of FIG. 5A is therefore obvious to an ordinary skilled person by reference to the disclosure above for the apparatus of FIG. 3A. FIG. 5C depicts the source drivers 352 of the third embodiment of the apparatus according to the present invention. Each of the source drivers 352 includes a switch 552 to switch between the connection to the fourth receiving node 514, which is supplied by the sensing-mode source-drive voltage 508, and the connection to the gamma-mapped display voltage 553 during the sensing mode and display mode respectively.

Figure 6:
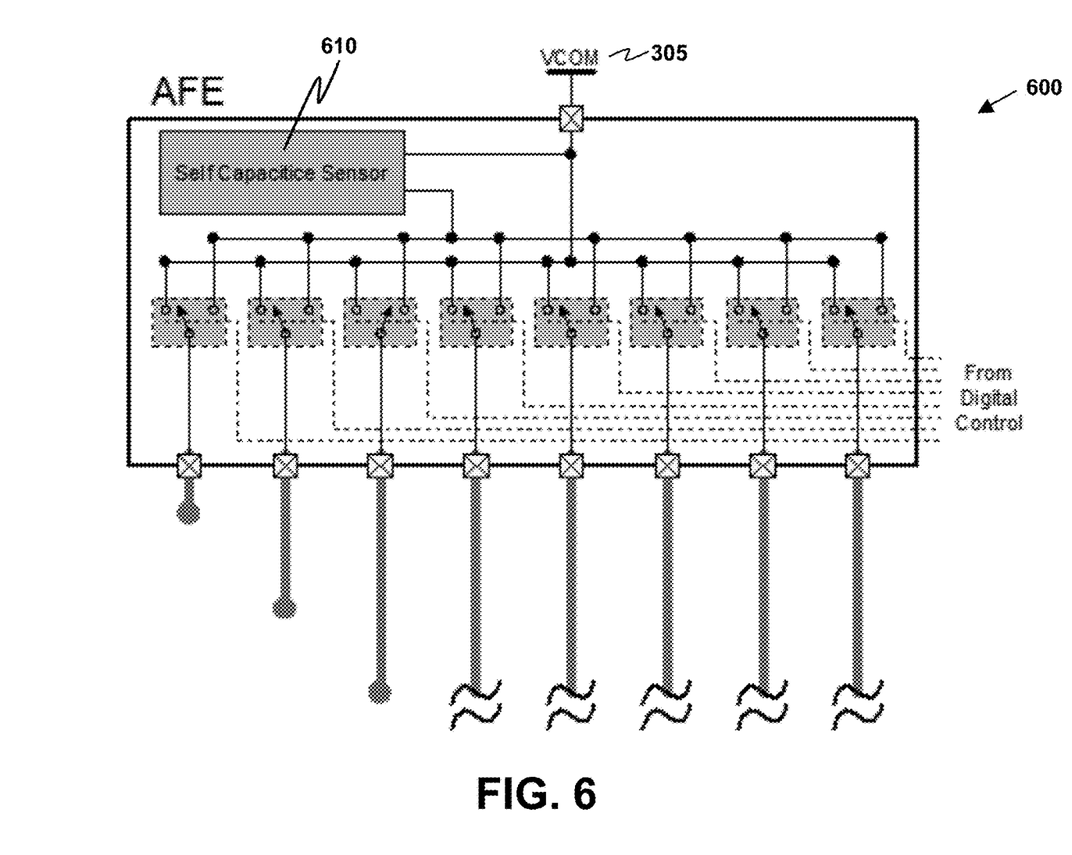
FIG. 6 is one realization of an analog front end (AFE) used in the panel, where the AFE includes a self-capacitance sensor for sensing if a touch is made.

As is mentioned above, a further reduction in circuit complexity is obtainable by using the common voltage 305 as a touch-sensing signal for sensing a presence of a touch made at the panel 301 during the sensing mode 391. It is achievable by using an analog front end (AFE). Refer to FIG. 3A. The apparatus further comprises a plurality of AFEs 353 each connected to the common voltage 305 and each equipped with a means for detecting a touch made on the panel 301. One realization of AFE is shown in FIG. 6. An AFE 600 includes a self-capacitance sensor 610 for detecting the presence of the touch, wherein the self-capacitance sensor 610 is configured to receive the common voltage as the touch sensing signal.

In practical implementation, the embodiments of the apparatus as disclosed herein may be fabricated as an integrated device or an integrated circuit.

In industrial applications, the apparatus can be made as a display driver having a function of touch sensing, or an integrated controller having functionalities of controlling image display and detecting on-screen touch. The apparatus may also be integrated in an interactive display system, a smartphone, or a tablet computer.

The various electronic embodiments of the apparatus as disclosed herein may be implemented using general purpose or specialized computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. An apparatus for driving a touch-sensing-enabled active matrix LCD display panel, the panel being configurable to be operated in a display mode or in a sensing mode, the apparatus comprising:
   one or more voltage generators for generating a plurality of driving voltages, the plurality of driving voltages including a common voltage for powering a backplane of the panel, a first gate-drive reference voltage receivable by a gate of a thin film transistor (TFT) in each LCD cell of the panel for configuring the TFT to switch on during the display mode, and a second gate-drive reference voltage receivable by the gate of the TFT for configuring the TFT to switch off during the display mode;
   a first switch, a second switch, a third switch, a first capacitor, a second capacitor, a third capacitor, a first receiving node connectable to the panel for enabling the panel to receive the common voltage, a plurality of gate drivers for providing a gate-drive signal to the TFT, a second receiving node connectable to the plurality of gate drivers for enabling the plurality of gate drivers to receive the first gate-drive reference voltage, and a third receiving node connectable to the plurality of gate drivers for enabling the plurality of gate drivers to receive the second gate-drive reference voltage;
   wherein:
   the one or more voltage generators are configured such that when the panel is operated in the sensing mode, the common voltage that is generated includes a pulse-train waveform, and such that each of the first and the second gate-drive reference voltages is substantially time-synchronized to and includes the pulse-train waveform of the common voltage during the sensing mode;
   the one or more voltage generators include a first voltage generator for providing a first substantially-constant voltage receivable as the common voltage by the panel during the display mode, a second voltage generator for providing a second substantially-constant voltage to form the first gate-drive reference voltage during the display mode, a third voltage generator for providing a third substantially-constant voltage to form the second gate-drive reference voltage during the display mode, and a waveform generator activated only during the sensing mode to generate the pulse-train waveform;
   the first switch couples the first voltage generator and the first receiving node, the second switch couples the second voltage generator and the second receiving node, and the third switch couples the third voltage generator and the third receiving node, wherein the first, the second and the third switches are configured to be connected during the display mode and disconnected during the sensing mode; and
   the first capacitor couples the first receiving node and a waveform output of the waveform generator, the second capacitor couples the second receiving node and the waveform output, and the third capacitor couples the third receiving node and the waveform output, such that during the sensing mode, the pulse-train waveform is simultaneously directed to the first, the second and the third receiving nodes through capacitive coupling.

2. The apparatus of claim 1, further comprising a plurality of source drivers for providing a source-drive signal to the TFT, wherein the common voltage during the sensing mode has a minimum value substantially similar to a negative supply voltage used for powering the plurality of source drivers.

3. The apparatus of claim 1, further comprising a plurality of source drivers for providing a source-drive signal to the TFT, wherein the pulse-train waveform has a voltage swing substantially similar to a supply voltage used for powering the plurality of source drivers.

4. The apparatus of claim 1, wherein:
   the plurality of driving voltages further includes a sensing-mode source-drive voltage acting as a source-drive signal applied to the TFT during the sensing mode; and
   the one or more voltage generators are further configured such that the sensing-mode source-drive voltage is substantially time-synchronized to and includes the pulse-train waveform of the common voltage during the sensing mode.

5. The apparatus of claim 4, further comprising a plurality of source drivers for providing the source-drive signal to the TFT, wherein the common voltage during the sensing mode has a minimum value substantially similar to a negative supply voltage used for powering the plurality of source drivers.

6. The apparatus of claim 1, further comprising a fourth switch coupling the first receiving node and a ground, wherein:
   the fourth switch is configured to be disconnected during the display mode and become connected for a time period when the panel transits from the display mode to the sensing mode where the time period ends before an earliest transition in the pulse-train waveform generated during the sensing mode by the waveform generator, thereby setting the common voltage to a ground voltage when the panel transits from the display mode to the sensing mode.

7. The apparatus of claim 6, further comprising a plurality of source drivers for providing a source-drive signal to the TFT, wherein the pulse-train waveform has a voltage swing substantially similar to a positive supply voltage used for powering the plurality of source drivers.

8. The apparatus of claim 6, wherein the apparatus is fabricated as an integrated device or an integrated circuit.

9. The apparatus of claim 1, further comprising:
a plurality of source drivers for providing a source-drive signal to the TFT, configured to use a sensing-mode source-drive voltage to act as the source-drive signal during the sensing mode;
a fourth receiving node connectable to the plurality of source drivers for enabling the plurality of source drivers to receive the sensing-mode source-drive voltage; and
a fourth capacitor coupling the waveform output and the fourth receiving node such that during the sensing mode, the pulse-train waveform is simultaneously directed to the first, the second, the third and the fourth receiving nodes through capacitive coupling.

10. The apparatus of claim 9, wherein the apparatus is fabricated as an integrated device or an integrated circuit.

11. The apparatus of claim 1, wherein when the panel is operated in the sensing mode, the common voltage is used as a touch sensing signal for sensing a presence of a touch made at the panel.

12. The apparatus of claim 11, further comprising a plurality of analog front ends (AFEs) each of which includes a self capacitance sensor for detecting the presence of a touch made at the panel, wherein the self capacitance sensor is configured to receive the common voltage.

13. The apparatus of claim 1, wherein the apparatus is fabricated as an integrated device or an integrated circuit.

* * * * *